Jan. 7, 1969    E. T. LIGHTCAP    3,421,080
LINEAR VELOCITY MEASURING DEVICE FOR RAM PISTONS
Filed Oct. 21, 1966
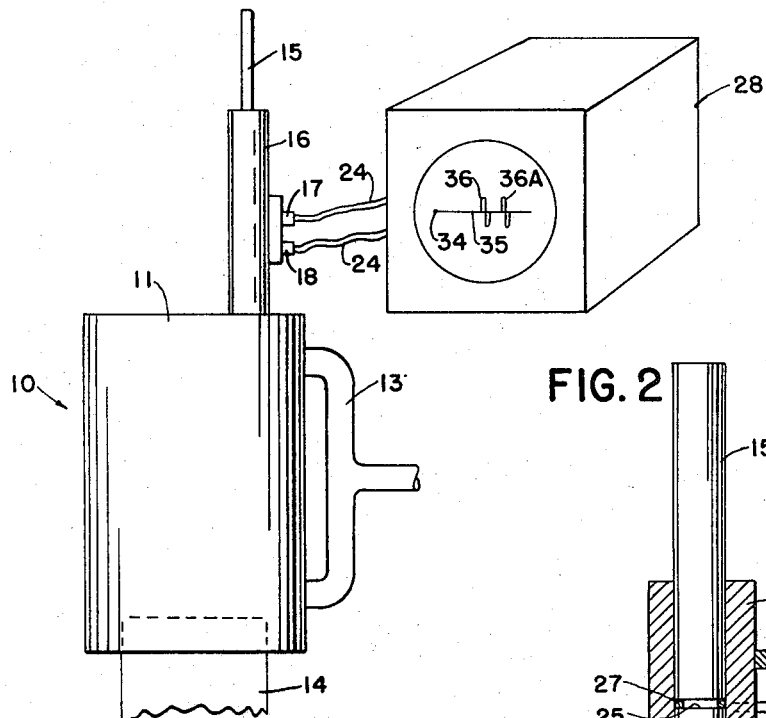
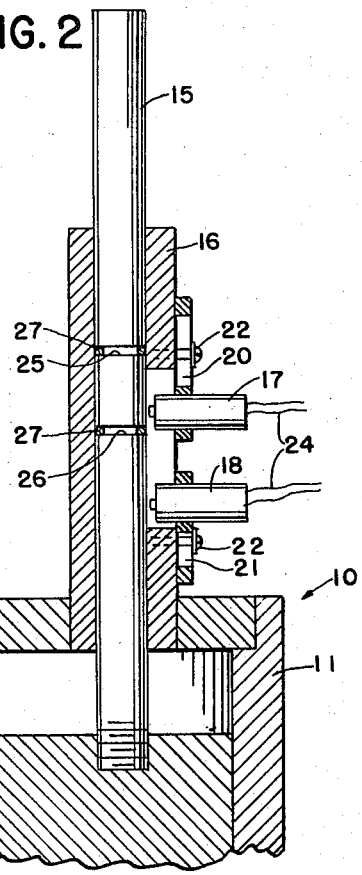
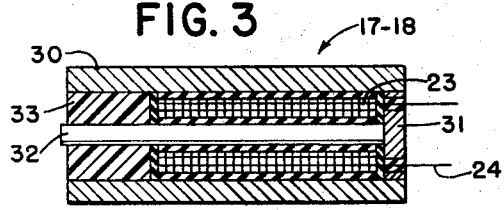
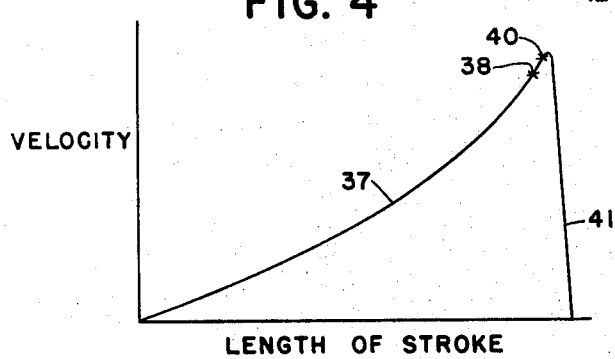
EDWIN T. LIGHTCAP
INVENTOR
BY Ralph E. Bitner
ATTORNEY

3,421,080
LINEAR VELOCITY MEASURING DEVICE FOR RAM PISTONS

Edwin T. Lightcap, Succasunna, N.J., assignor, by mesne assignments, to Caldwell Research Corporation, Livingston, N.J., a corporation of New Jersey
Filed Oct. 21, 1966, Ser. No. 588,611
U.S. Cl. 324—70         8 Claims
Int. Cl. G01r 11/00

This invention relates to a velocity measuring device for use in connection with rams, pistons, and other heavy impact producing objects whose velocity varies greatly with the length of travel and with the object moved. The invention has particular relationship to a device which can be used to calculate the total amount of energy applied to a movable object by a ram or piston.

It is important to know how much energy is being applied to a movable object, particularly to a pile which is being driven into the ground. An accurate measurement of the amount of energy is important not only to determine whether or not the ram mechanism is working properly, but also to determine whether a pile has been driven into the ground for a distance which corresponds to a safe loading value. This value is determined by an engineering formula which includes the energy delivered to the pile and the distance the pile moves at each impact. Energy values may be measured in a number of ways but it is difficult to apply sensitive instruments to a pile driver or any type of ram mechanism because of the heavy shock and vibration which is produced by each impact. The present invention employs only rugged devices secured to the ram mechanism. The actual measurement of the energy and velocity is determined by viewing and measuring a cathode ray oscillograph which may be positioned at a safe distance from the ram mechanism and not subject to the shock and vibration produced by it. The device is nondestructive and can be used during the entire positioning of a pile, each stroke being capable of measurement immediately after the end of the stroke.

One of the objects of this invention is to provide an improved velocity measuring device which avoids one or more of the disadvantages and limitations of prior art arrangements.

Another object of the invention is to measure the velocity of a ram at the point of impact.

Another object of the invention is to calculate the total energy delivered to the object to be moved.

Another object of the invention is to measure the velocity of an object by observing the trace of a cathode ray beam at a position which may be remote from the ram cylinder.

Another object of the invention is to provide a velocity measuring device which is rugged enough to withstand the shock and vibration produced by heavy impact rams and still measure the velocity of the ram with a high degree of accuracy.

The invention includes a velocity measuring device for ram pistons comprising a shaft secured to the ram and slidably positioned in a cylinder for movement by the ram. The shaft is provided with two annular channels spaced along its length. Two magnetic sensing devices are secured to the cylinder and positioned adjacent to the shaft for sensing the passage of the channels when the ram is moved relative to the cylinder. A cathode ray oscillograph is employed for measuring the elapsed time between the passage of the annular channels past the sensing devices. The oscillograph includes the usual focused electron beam, a fluorescent screen, a first deflection means for moving the electron beam horizontally, and a second deflection means for moving the electron beam vertically. The two sensing means are respectively connected to the two deflection means, one coupling circuit arranged to start the electron beam in a horizontal direction and the other coupling means arranged to move the electron beam vertically.

For a better understanding of the present invention, together with other and further objects thereof, reference is made to the following description taken in connection with the accompanying drawings.

FIG. 1 is a side view of a pile driver showing a measuring shaft attached to the ram piston and an oscillograph coupled to two sensing devices by means of electric conductors.

FIG. 2 is a cross sectional view showing the details of the measuring shaft and the sensing devices.

FIG. 3 is a cross sectional view, to an enlarged scale, showing the details of one of the sensing devices.

FIG. 4 is a graph showing the relationship between the velocity of the ram and the length of stroke, and an indication of the portion of the stroke used in determining the velocity.

Referring now to the figures, the impact mechanism 10 which may be a pile driver, is indicated having an enclosing cylinder 11, an impact ram 12, and conduit means 13 which may be employed to supply the cylinder with a fluid under pressure in order to return the ram to its starting position and to add pressure to the ram during its downward stroke. The invention may be used for applying heavy impacts to any object to be moved. As shown in FIG. 1, the impact device is positioned over the upper end of a pile 14 for driving it downwardly.

In order to obtain a measurement of velocity, a shaft 15 is secured to the upper end of the ram 12 by any suitable means, such as a screw connection. The shaft 15 is slidably positioned in a cylinder 16 so that it moves along the length of the cylinder when the ram 12 is moved. Secured to the side of the cylinder are two magnetic sensing devices 17 and 18, these devices being secured to adjustable mounting brackets 20 and 21. The brackets are secured to the cylinder 16 by clamping screws 22 or by any other convenient means. Each of the sensing devices contains a winding 23 (FIG. 3) the ends of which are connected to a pair of conductors 24. The shaft 15 is formed with two annular channels 25 and 26, these channels arranged for creating an impulse in the sensing devices 17 and 18 when the channels pass the adjacent ends of these devices. If the shaft 15 is made of iron or any other ferromagnetic material, the channels themselves are sufficient to provide a magnetic pulse which can be transferred over conductors 24 to a cathode ray display device 28. If the shaft 15 is made of brass or some other non-magnetic material, the channels 25 and 26 are provided with magnetic inserts 27 such as a ring of soft iron. These rings 27 will also provide a magnetic pulse in windings 23 when they pass the sensing devices. It has been found that a non-magnetic shaft 15 and soft iron rings within the channels provide a more dependable magnetic pulse and therefore this construction is preferred.

Referring now to FIG. 3, the details of the sensing devices are shown. Each sensing device includes a cylinder 30 made of ferromagnetic material. The cylinder 30 is secured to a base disk 31 and a ferromagnetic core 32 is mounted on the disk 31 in axial alignment with cylinder 30. A winding 23 is positioned in cylinder 30 around core 32 and a potting compound 33 is positioned at one end of the sensing device for securing the winding and for protecting the interior of the sensing means from rain and humidity. This type of sensing device is old in the art and components similar to the devices shown are available commercially.

The operation of this device is as follows: when the ram 12 is at its upper limit, the shaft 15 is positioned as shown in FIG. 2. The ram 12 is now permitted to fall under the force of gravity and, in addition there may be compressed air or other fluid under pressure applied to the space above the ram. Under these forces the ram moves downwardly to complete its active stroke. During this stroke the first channel 25 passes the upper sensing device 17 and a pulse is generated which is transmitted over conductors 24 to the cathode ray oscillograph, thereby starting the cathode beam from a rest position 34 to move horizontally over a line 35 at a uniform velocity. When the ram 12 and the shaft 15 approach the end of their travel, the second channel 26 passes the lower sensing device 18 and a second pulse is sent over conductors 24 to the display device 28, this time energizing the vertical deflection means and producing a pulse 36 shown in FIG. 1. The distance between the spot 34 and the leading edge of the vertical pulse 36 is one means for measuring the velocity of the ram. Another method of measuring the velocity of the ram includes the adjustment of the second sensing device so that both slots 25 and 26 pass the core 32 of the device just prior to impact. This adjustment then produces two similar traces 36 and 36A on the screen and the distance between them is also a measure of the velocity.

FIG. 4 is a graph showing the relationship between the length of stroke and the ram velocity, curve 37 indicating the change in velocity. It is presumed that sensing device 17 is arranged so that the annular channel 25 will pass its pole piece at a position denoted by the cross 38. It is also presumed that the second sensing device 18 is positioned so that the vertical impulse is generated at a position 40 just prior to the impact.

In order to determine the total energy of the ram the well-known energy formula is used $$E = MV^2/2g$$

where E is the energy in foot pounds, M is the weight of the ram in pounds, V is the velocity in feet per second as determined by the above described apparatus, and $g$ is the acceleration of gravity. After impact, the ram velocity is reduced to zero quickly by the pile movement, this portion of the stroke being illustrated by the curve 41.

The cathode ray oscillograph has not been described in detail since these instruments are well-known and have been described in books and periodicals. One such book is "Time Bases" by Puckle, published in New York by John Wiley and Sons in 1943. Another book is "Electronic Instruments" by Greenwood, Holdam, and Macrae, published by McGraw-Hill in 1948, p. 580. The deflection current is started by the pulse received from the first sensing device 17 and this pulse may be used to trigger a thyratron or to make a silicon controlled rectifier conductive. When either of these components are used, the pulse is applied to the first grid of the thyratron or to the control electrode of the S.C.R. In either case, the current which flows through the anode-cathode circuit generates the deflection current or voltage which moves the cathode spot on the screen in a horizontal direction as indicated in FIG. 1.

The foregoing disclosure and drawings are merely illustrative of the principles of this invention and are not to be interpreted in a limiting sense. The only limitations are to be determined from the scope of the appended claims.

I claim:
1. A velocity measuring device for ram pistons comprising; a shaft secured to the ram and slidably positioned in a cylinder for movement with the ram, said shaft having two annular channels spaced along the length of the shaft; two magnetic sensing devices secured to and spaced along the length of the cylinder and positioned adjacent to the shaft for sensing the passage of the channels when the ram is moved relative to the cylinder; a cathode ray oscillograph including a focussed electron beam, a fluorescent screen, a first deflection means for moving the electrol beam horizontally, and a second deflection means for moving the electron beam vertically; a first coupling means between one of the sensing devices and said first deflection means for starting the electron beam to move in a horizontal direction when one of said channels passes the sensing device; and a second coupling means between the other sensing device and the second deflection means for moving the electron beam in a vertical direction when the other annular channel passes the other sensing device.

2. A velocity measuring device as claimed in claim 1 wherein said annular channels are filled with ferromagnetic material.

3. A velocity measuring device as claimed in claim 1 wherein each of said magnetic sensing devices includes a central ferromagnetic core surrounded by an electrical winding.

4. A velocity measuring device as claimed in claim 1 wherein said first and second deflection means in the cathode ray oscillograph include magnetic windings positioned around the oscillograph envelope.

5. A velocity measuring device as claimed in claim 1 wherein said first and second deflection means in the cathode ray oscillograph include electrostatic plates positioned within the oscillograph envelope.

6. A velocity measuring device as claimed in claim 1 wherein the positions of said sensing devices are adjustable along the length of the cylinder.

7. A velocity measuring device as claimed in claim 1 wherein said coupling means between one of the sensing devices and the first deflection means includes a silicon controlled rectifier having a control electrode coupled to the sensing device and an anode-cathode circuit coupled to the first deflection means.

8. A velocity measuring device as claimed in claim 7 wherein said anode-cathode circuit is coupled to a deflection circuit which moves the eletron beam horizontally at a predetermined uniform velocity.

References Cited

UNITED STATES PATENTS

| 2,434,349 | 1/1948 | Cohen | 324—70 |
| 2,783,836 | 3/1957 | Kenline | 324—70 |
| 2,877,415 | 3/1959 | Rolle | 324—70 |
| 3,307,164 | 2/1967 | Zimmer | 324—70 |

RUDOLPH V. ROLINEC, *Primary Examiner.*

MICHAEL J. LYNCH, *Assistant Examiner.*